Dec. 2, 1958 E. E. FRANZ 2,862,992

ELECTRICAL NETWORK ASSEMBLY

Filed May 3, 1954 2 Sheets-Sheet 1

INVENTOR
E. E. FRANZ
BY John C. Morris
ATTORNEY

Dec. 2, 1958 E. E. FRANZ 2,862,992

ELECTRICAL NETWORK ASSEMBLY

Filed May 3, 1954 2 Sheets-Sheet 2

INVENTOR
E. E. FRANZ
BY John C Moris
ATTORNEY 2,862,992

ELECTRICAL NETWORK ASSEMBLY

Erwin E. Franz, Cranford, N. J., assignor to Bell Telephone Laboratories, Incorporated, New York, N. Y., a corporation of New York Application May 3, 1954, Serial No. 427,130

7 Claims. (Cl. 174—52)

This invention relates to electrical networks and more particularly to miniaturized network assemblies.

An object of this invention is to realize a compact rugged miniature electrical assembly which may be assembled with a minimum of complex skills and manual tasks.

Other objects of this invention are to utilize efficiently apertured members of a network assembly to position, support and interconnect the circuit elements before encapsulating; to realize an improved miniaturized and highly compact network employing "printed circuit" techniques; and to facilitate the assembly and interconnecting of components in miniaturized network packages.

These objects are accomplished in one specific illustrative embodiment of this invention comprising a plastic encased transistor network, in which the circuit components are mounted between a pair of spaced insulating apertured members or matrices of substantial depth. The components are supported in recesses in adjacent surfaces with their connecting leads extending through the matrices to the opposite or outer surfaces and are there interconnected by conducting filaments imbedded in the outer surfaces. Terminals are imbedded in an end of each matrix, each with a portion exposed to a conducting material in a well in the outer surface, and joined to the electrical network through the filamentary conducting paths. The matrix members are positioned in three planes by pins extending therebetween.

In another embodiment, terminal pins and corresponding contacting socket elements are imbedded in opposite ends of the matrices, each with portions in the conducting material filled well, which is joined to the network circuitry.

In accordance with one feature of this invention, the matrices of insulating material being of substantial depth perform the multiple functions of jigging, aligning, mounting and electrically interconnecting each of the components into the network. More specific features of this invention involve the configuration of the matrices by which each component is accurately spaced and oriented with regard to the other circuit elements and the connecting circuitry; and the interconnection of circuit elements and terminals simultaneously through conducting material filled wells and grooves in a surface of each matrix.

In accordance with another feature of this invention, spacing and aligning pillars may terminate at the conducting paths allowing transfer of the circuit from one matrix to the other.

In accordance with another feature, the conducting channels are of varying depths, certain portions of the channels being of sufficient depth to contact the relatively broad terminal end surfaces of respective leadless components. The deep channels which perforate the matrices at the desired component or components may pass over any portion of the component's end surfaces to make contact therewith.

A more complete understanding of this invention may be had from the following detailed description and by reference to the accompanying drawing in which.

Figures 2, 9, 10, 11:
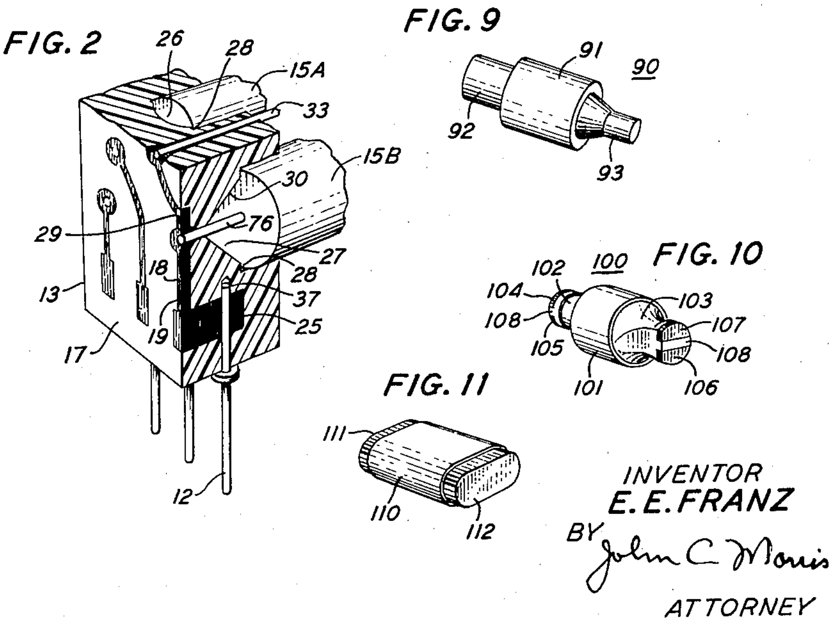
Fig. 2 is a magnified view of a fragmentary portion of the assembly of Fig. 1 shown partly in section.
Figure 4:
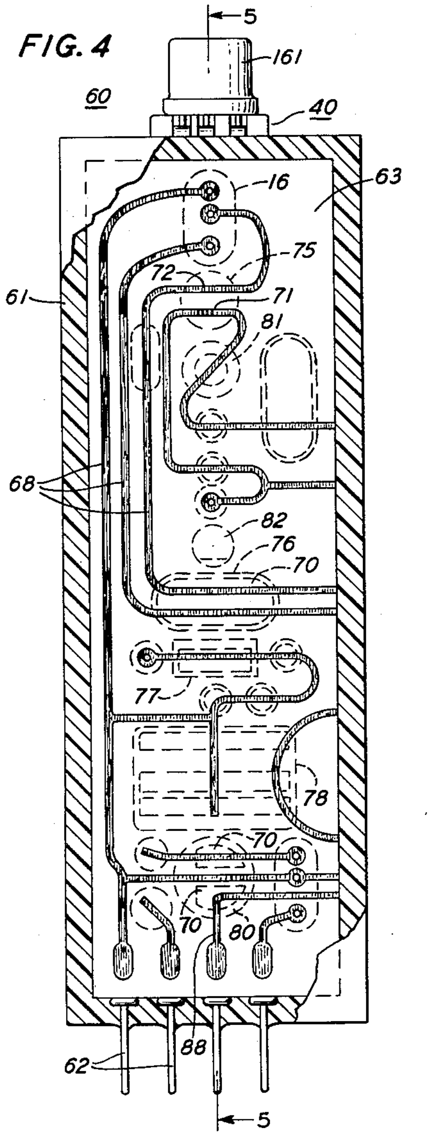
Fig. 4 is an elevational view of an electrical network incorporating leadless components.
Figure 5:
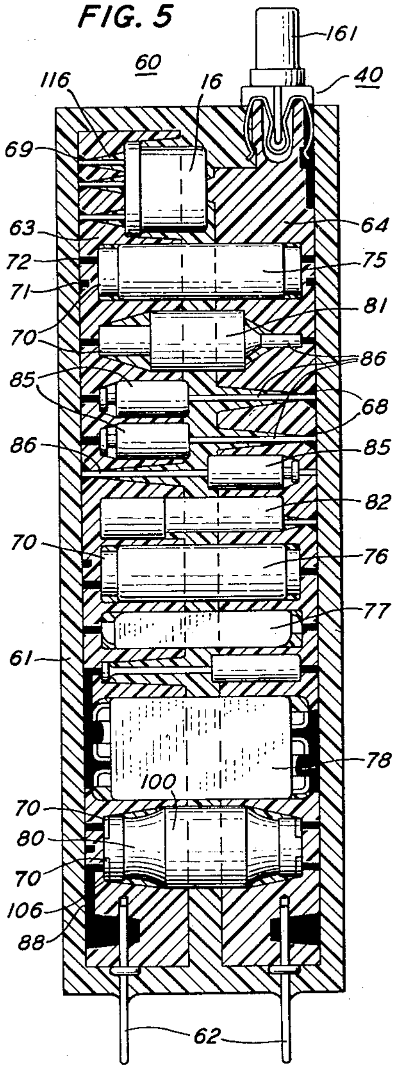
Fig. 5 is a cross-sectional view of the network of Fig. 4.
Figures 6, 7, 8:
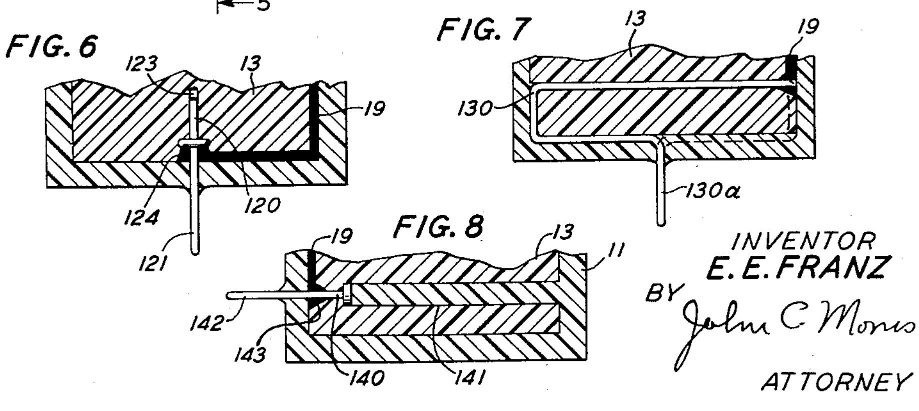

Figs. 6, 7 and 8 illustrate modified forms of terminals for packaged networks; and Figs. 9, 10 and 11 are representations of typical leadless components employed in the network of Figs. 4 and 5.

Figure 1:
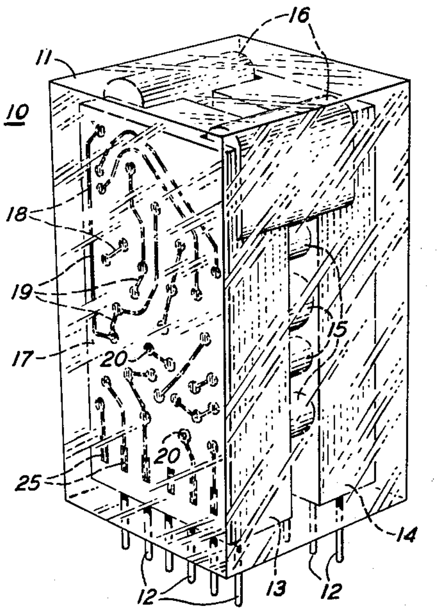
Fig. 1 is a perspective view of an encapsulated network assembly incorporating this invention.

Referring now to Fig. 1, a miniaturized transistor network 10 may be seen enclosed within a transparent encasement 11 of insulating material, for example, clear epoxy type resin. Extending from one end of the encasement 11 are two rows of terminal pins 12, one row imbedded in each of a pair of spaced insulating matrices or frames 13 and 14. Mounted between the matrices 13 and 14 are a plurality of circuit components, for example, capacitors, resistors and transformers designated generally by the numeral 15 and two transistors 16. The outer faces 17 of the matrices 13 and 14 include a plurality of channels or grooves 18 filled with a conducting material, for example, an interconnected maze of solid solder in the form of filaments 19 which comprise the circuitry of the network. Adjacent to the terminal end of the matrices 13 and 14 are a series of wells 25 in the outer faces 17. The wells 25 are filled with conducting material and are connected to prescribed portions of the circuitry by filaments 19, to terminals 12 and to selected component leads.

The encased unit 10 forms a rigid miniature assembly which may be plugged into a multiple socket of the type disclosed in my application Serial No. 478,714, filed December 30, 1954.

The particular cross-sectional configuration of matrix 13 may be seen in Fig. 2. There, two component recesses 26 and 27 of size and shape to conform to circuit elements 15A and 15B contained therein are shown. The particular components shown are cylindrical in shape and the recesses conform. Recess 27, which is exemplary of all of the component recesses in members 13 and 14, includes a shoulder 28, the position of which is correlated to the over-all length of the component and the standard distance between matrices 13 and 14. The shoulder 28 lies adjacent a lead aperture 29 connecting the recess 27 with the outer face 17 of the matrix 13. Aperture 29 includes a beveled guide portion 30 which is used to pilot the lead 76 therethrough. The outer face 17 adjoining aperture 29 includes one of the channels 18 which joins this particular element 15B with a terminal 12 and a transversing conductor 33. This conductor 33 is a length of wire which passes through both the matrixes 13 and 14, terminates in channels 18 in the outer faces of the matrices and thereby constitutes a cross-connection between the circuitry located on the outer faces. Such cross-connections allow transfer of the circuitry where one matrix outer face would otherwise be overcrowded or where the minimization of reactive coupling between conductors is a desideratum.

In complex networks it may be found advisable to include circuitry upon the sides of matrices to utilize those members even more efficiently.

The terminal 12 of Fig. 2 is a shouldered pin which is frictionally secured in a bore 37 extending from one end of matrix 13 through a well 25. The well 25 is filled with conducting material when the grooves are filled and is connected to the network by filament 19 in channel 18.

Matrices 13 and 14 are noted to be of sufficient depth to encompass the major portion of the body of each component 15 and all of the end lead wires in the finished assembly. The matrices 13 and 14 firmly position each component separate from nearby components and in contact with the prescribed filament 18. Correct placement of components is insured since each recess is keyed in shape, lateral dimensions and depth to a particular component body size. A normal group of components which make up a typical network includes a variety of shapes and sizes so that the likelihood of two non-equivalent components in the group having exactly the same shape, lateral dimensions and depth and therefore capable of being incorrectly mounted is slight. In the case of directional or polarized components having non-symmetrical body dimensions, the opposite recesses in the matrices correspond to the proper end of the component body. Correct assembly is assured since the recesses are in effect keyed only to the correct end of the proper component.

Figure 3:
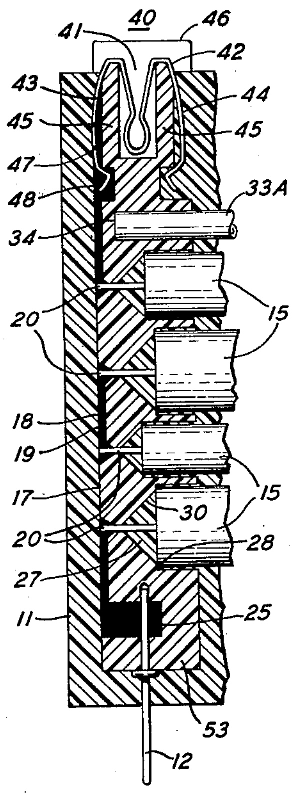
Fig. 3 is a longitudinal section of a portion of another embodiment of this invention which is designed for tandem mounting.

Fig. 3 illustrates another embodiment similar in several respects to the unit shown in Fig. 1 but differing in the inclusion of a number of sockets, one of which is shown at 40, integral with the end of matrix 13 and opposite the terminal pins 12, each for connecting a prong of an external component as a tube, transistor, etc.; or, for plugging-in other packages to avoid external interpackage wiring. The sockets 40 include a recess 41 in which a spring 42 is suspended by leg portions 43 and 44 which are clipped over the walls 45 of recess 41. The outer leg 43 rests in a groove 47 and terminates in slot 48 which, similar to the wells 25, is joined to a prescribed portion of the filamentary circuitry by a channel 18. Each socket recess 41 is separated from adjacent ones by an insulating plate or barrier 46 to increase surface leakage path. The socket shown in Fig. 3 is particularly advantageous in the assemblies of this invention since it is part of the matrix, connected by printed wiring techniques and imbedded in the encasing material. This socket is described more completely and claimed in my application cited heretofore. Several components 15 are shown mounted in a matrix 53 in the same manner as in the matrix 13 of Figs. 1 and 2. The encapsulating material which bonds the matrices 63 and 64 and forms the encasement 11, has flowed around each component 15 and completely fills the remainder of each component recess 27 resulting in a solid assembly.

Modified terminal forms are shown in Figs. 6, 7 and 8 wherein contact is made with the circuit by means of a counterbore in a conductor channel rather than through a well as shown in Figs. 1 through 5. In Fig. 6 the shank 120 of a shouldered pin 121 is frictionally secured in a longitudinally extending hole 123 in matrix 13. Conducting filament 19 contacts pin 121 at counterbore 124. The assembly as before is protected by encasement 11.

Fig. 7 shows a hairpin type terminal 130 passing transversely through matrix 13 secured therein and contacting a filament 19 at its end. Encasement 11 secures the pin portion 130A of the terminal 130. Another such terminal extending through matrix 13 in the opposite direction is indicated by a dotted line. A headed terminal 140 is advantageously employed where side mounting of the completed package is a design objective. Such an arrangement is shown in Fig. 8, where pin 140 is inserted in a bore 141 with the shank 142 extending beyond the matrix 13 through counterbore 143 which terminates filament 19. The terminal pin 140 is secured by the material of encasement 11 which fills bore 141.

Referring now to Figs. 4 and 5, a network assembly 60 may be seen including an encasement 61, terminal pins 62, matrices 63 and 64 which include a series of channels 68 in the outer faces, the channels 68 being filled with conducting filaments all similar to the corresponding elements of Figs. 1, 2 and 3. As in the previously described embodiments, individual components rest in recesses in the adjoining faces of the matrices. Certain of the components have leads, for example, transistor 16, which leads 116 extend through apertures 69 in matrix 63 to the external channels 68. Advantageously, other components are leadless and include conducting end surfaces 70 through which electrical contact is made. The channels 68, therefore, have discrete depths, for example, portion 71 of a channel 68 is purely a conductor so its depth is less than the matrix thickness. Channel portion 72 extends through matrix 63 and the conducting filament therein contacts the end surface terminal 70 of a component, in this case, a deposited carbon resistor 75. Other circuit elements, connected solely by the conducting material in the deepened channels are plastic film capacitor 76, ceramic capacitors 77 and 78, transformer 80 and germanium diode 81. Diode 81, along with tantalum electrolytic capacitors 85 include integral terminal pins 86 which serve as leads and are used in the same manner as shown in Figs. 1 to 3. That is, the pin extends to the outer surface lying in a counterbored portion of one of the channels 68. The combination of a single lead wire or pin and a large contacting surface at opposite ends of polarized circuit elements coupled with suitable orifices for each effectively keys these elements for proper assembly and proper polarity.

The advantage in connecting nonpolarized elements by deepened channels is apparent in Fig. 4. With a broad contacting area available on the component, substantial freedom is obtained for the placement of the channel. The channel may pass over any portion of the contacting area, and is not limited to a small central lead area. For example, the primary winding of transformer 100 is contacted by a channel 88 diverted over contact 106.

Of equal importance is the characteristic that no space consuming widening of the channel is necessitated as by a counterbore around lead wires. In the assembly of Figs. 4 and 5, integral sockets 40 mount a transistor 161 accessibly exterior to the package.

The shape of certain of the components referred to above may be more clearly seen in Figs. 9, 10 and 11. Fig. 9 shows a Western Electric Company, Incorporated, 400 type germanium diode generally designated 90, including an insulating body portion 91, a base terminal 92 and a rectifier terminal 93. The base terminal 92 is cylindrical and substantially larger than terminal 93 which includes a tapered portion. The recesses in matrices 63 and 64 for the diode as may be seen in Fig. 5 correspond in size and shape to a respective terminal 92 or 93.

A miniature transformer 100 shown in Fig. 10 includes a winding and core enclosed within an encasement 101, terminal projections 102 and 103, individual primary terminals 104 and 105 and secondary terminals 106 and 107. Primary terminals 104 and 105 are semicircular segments of conducting material, for example solder, separated by an insulating band 109. Terminal projection 103 includes a flat side which keys the transformer for proper mounting and abbreviated segments of conducting material as terminals 106 and 107. The secondary terminals 106 and 107 similar to primary terminals 104 and 105 are separated by an insulating band 108 and are internally connected to the appropriate winding.

Fig. 11 shows a nonpolarized roll type plastic film capacitor 110 including identical conducting end surfaces 111 and 112 since an end for end reversal of this component in mounting has no effect upon the circuit performance.

The encapsulated networks of Figs. 1, 3, 4 and 5 are all assembled in substantially the same manner. The matrices are precast of a moisture resistant resin. An example of such a material is the epoxy type resin known as C–8 manufactured by Bakelite Corporation. The epoxy resin which may include an inert filler is poured into a suitable mold in liquid form and set by the addition of a hardener.

The units of Figs. 1 and 3 are assembled by dropping each of the several components 15 into its recess with one lead extending through its respective opening in the matrix 13. The transversing conductors 33 and pillars 33A are also inserted. The matrix 14 is then placed over the leads 20 and pillars 33A where it comes to rest against the ends of each of the pillars 33A affording slight end clearance for components 15 with leads 20 protruding a slight distance beyond each outer face 17. The two outer faces 17 are then simultaneously coated with conducting material by such means as the "Schoop" process for spraying molten metal, by applying conducting paint or any other of the well known methods of applying printed circuitry. Spraying with a coating of solder results in a metallic blanket over each face 17 filling the channels 18 and wells 38 and surrounding each lead 20. The excess material is then removed as by grinding as is well known in the printed circuit art, leaving the filamentary conductors 19 joining leads 20 now flush with the surface and terminals 12 in wells 25.

The terminals shown in Figs. 6 and 8 are not adapted for the grinding step since they protrude above the surface to be ground. Therefore, the terminals of Figs. 1 through 5 are more advantageously used.

The network assemblies of Figs. 4 and 5 employ matrices in which the channels of discrete depths and component recesses are preformed. The recesses for the polarized components are of such dimensions to receive only the correct end, thereby insuring correct assembly. Coating of the outer matrix faces with molten metal fills the grooves and allows the filaments of metal to flow through the matrix and contact the terminal surfaces of each component. The unit at this stage evidences marked rigidity and actually may be used in this form. A dip coating of epoxy resin will offer sufficient protection for the circuitry while the components are protected within their respective recesses. It has been found advantageous, however, to encapsulate the assembly completely as shown in Figs. 1, 3, 4 and 5 within an encasement of resinous dielectric material such as the epoxy resin already mentioned. In the case of the assembly of Fig. 1, this can be accomplished in an open ended mold in which the unit is suspended in an inverted position from the protruding portion of the terminals. The units of Figs. 3, 4 and 5 are encapsulated in a closed end mold to avoid filling the sockets.

An indication of the compactness obtainable of assemblies of this invention is found in the over-all dimensions of the unit of Fig. 1. Encasement 11 measures 1.6 inches in length and 0.8 inch in both width and depth. Despite this, small size components numbering over thirty are included, each mounted in an individual pair of complementary recesses apart from the other circuit elements. The matrices themselves measure 5/16" x 11/16" x 1 15/32". Although the matrices 13 and 14 may be mounted in mating relationship, it has been found that certain advantages are obtained when their depths, though sufficient to align the components, are less than is required to encompass the components completely. First, the encasing material is free to flow into the gap between the matrices and surround all of the circuit elements and eliminate any voids which might otherwise exist in the completed encasement. Good heat dissipation is obtained due to the intimate contact between the elements and the encasing material when complete encapsulation of components, their leads and matrices is effected.

Manufacturing miniaturized networks is greatly facilitated by employing the principles of this invention. The matrices form the heart of the assembly since they accurately select, position and hold each component interrelatedly and related to the grooves which offer the base for the circuitry of the network. Terminals and sockets for the networks are both mounted by the matrices and simultaneously connected to the network through conducting material filled wells in the matrix outer surface. Error in assembly is eliminated since the component positioning recesses are each keyed to a particular component and any attempt to position such in an incorrect recess results in an obvious misfit and so its assembly and the attempted assembly of the other matrix is prevented until the error is corrected.

The particular assemblies shown in the drawing and described herein as well as the particular components and circuitry are, of course, exemplary of an application of this invention to a particular miniaturized network and is not to be limited thereby. Numerous other arrangements may be devised by those skilled in the art without departing from the spirit and scope of the invention.

What is claimed is:

1. An electrical network assembly comprising a unitary insulating matrix including a plurality of recesses in one major face thereof and extending substantially perpendicular to said major face, each of said recesses being shaped to conform to the body portion of a circuit component and having a length correlated to the length of said body portion, apertures communicating between the recesses and a second major face and a series of channels in said second major face joining certain of said apertures in a predetermined circuit arrangement, a plurality of electrical components positioned each within a respective recess in said matrix with electrical leads extending through the aperture in said recess, filaments of conducting material in said series of channels, electrically connecting said components into an electrical network, and terminal means secured by embedment in said insulating matrix including portions in electrical contact with said filament of conductive material.

2. An electrcal network assembly in accordance with claim 1 wherein said second major face includes a series of wells adjacent one edge, and said terminal means comprises a plurality of terminal pins imbedded in an end surface of said matrix with portions passing through a respective well, conducting material filling said well and electrically connecting the terminal pins to specific portions of the electrical network.

3. An electrical network assembly in accordance with claim 2 wherein a spring socket element is imbedded in an end of said insulating matrix opposite said terminal pins, a portion of said spring socket element rests in a well in said second major face, said well being filled with conducting material constituting a continuation of said filaments, said spring socket element being connected to said filaments through said conducting material filled well.

4. An electrical network assembly adapted for tandem mounting comprising a pair of matrices of insulating material mounted in spaced parallel relation, said matrices including aligned recesses in the adjacent faces and tapered apertures communicating between said recesses and remote faces of said matrices, each of said recesses being shaped to conform to the body portion of a circuit component and of sufficient depth to substantially enclose said component, a plurality of said electrical components mounted each within a pair of aligned recesses with leads extending through the apertures in said matrices, terminal means imbedded in said matrices at opposite ends thereof including portions exposed to said remote faces, a series of filamentary conducting paths on said remote faces joining certain of said apertures and terminal means in a prescribed arrangement.

5. The assembly in accordance with claim 4 wherein said terminal means at one end of said matrices comprise a pin, one end of which is imbedded in the frame member and includes a portion passing through a well in the outer surface of one of said frame members and the terminal means at the opposite end comprises a spring element in a socket recess of said matrices including a portion of said spring element exposed to said remote surface of the matrices, said portion electrically connected to said series of filamentary conducting paths.

6. An electrical assembly comprising an insulating matrix having a pair of major faces and defining a plurality of electrical recesses in a first of said major faces, each of said recesses being shaped to conform to a portion of a circuit component, an electrical component having conducting surfaces positioned in each respective recess, a system of interconnecting grooves in the second of said major faces, said system of grooves having portions of two discrete depths including a first portion of depth less than the distance between said second major face and adjacent recesses and a second portion of depth great enough to expose the terminal portion of said components, and a plurality of filaments of conducting material filling said system of grooves to interconnect said components at said second portions.

7. An electrical assembly in accordance with claim 6 wherein certain of said filaments of conducting material terminate in conducting material filled wells adjacent an edge of said second major face and terminal means imbedded in said matrix having a portion lying in said wells.

References Cited in the file of this patent

UNITED STATES PATENTS

| | | |
|---|---|---|
| 2,512,162 | Lips | June 20, 1950 |
| 2,547,022 | Leno | Apr. 3, 1951 |
| 2,590,821 | Kiser | Mar. 25, 1952 |
| 2,607,821 | Van Arsdell | Aug. 19, 1952 |
| 2,613,244 | Del Camp | Oct. 7, 1952 |
| 2,651,007 | Shepard | Sept. 1, 1953 |
| 2,668,933 | Shapiro | Feb. 9, 1954 |
| 2,774,052 | Flour | Dec. 11, 1956 |

FOREIGN PATENTS

| | | |
|---|---|---|
| 129,601 | Australia | Oct. 25, 1948 |